(12) United States Patent
Ma et al.

(10) Patent No.: US 8,550,836 B2
(45) Date of Patent: Oct. 8, 2013

(54) MOUNTING APPARATUS FOR MEMORY CARD

(75) Inventors: Xiao-Feng Ma, Shenzhen (CN); Zheng-Heng Sun, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 24 days.

(21) Appl. No.: 13/337,319

(22) Filed: Dec. 27, 2011

(65) Prior Publication Data

US 2013/0164951 A1   Jun. 27, 2013

(30) Foreign Application Priority Data

Dec. 22, 2011   (CN) .......................... 2011 1 0435052

(51) Int. Cl.
*H01R 13/62* (2006.01)
(52) U.S. Cl.
USPC ............................ 439/328; 439/630; 439/932
(58) Field of Classification Search
USPC ......................................... 439/327, 630, 328
See application file for complete search history.

(56) References Cited

U.S. PATENT DOCUMENTS

| | | | | |
|---|---|---|---|---|
| 5,943,218 A * | 8/1999 | Liu | | 361/801 |
| 6,056,579 A * | 5/2000 | Richards et al. | | 439/358 |
| 6,305,964 B1 * | 10/2001 | Pon et al. | | 439/327 |
| 6,517,369 B1 * | 2/2003 | Butterbaugh et al. | | 439/327 |
| 6,529,386 B2 * | 3/2003 | Boe | | 361/801 |
| 7,303,419 B1 * | 12/2007 | Ju et al. | | 439/327 |
| 7,641,495 B1 * | 1/2010 | Sun | | 439/327 |
| 2012/0033380 A1 * | 2/2012 | Sun | | 361/695 |

* cited by examiner

*Primary Examiner* — Hien Vu
(74) *Attorney, Agent, or Firm* — Altis & Wispro Law Group, Inc.

(57) ABSTRACT

A mounting apparatus for mounting a memory card to a printed circuit board (PCB) includes a connector mounted on the PCB and a fixing member. The connector defines a slot in a top surface for electrically receiving the memory card. An ear protrudes from each of opposite end surfaces of the connector and defines a through hole. The fixing member includes a bar abutted against a top of the memory, two legs respectively extending down from opposite ends of the bar to abut against opposite ends of the memory card, and two deformable latches respectively extending from distal ends of the legs and engaged in the corresponding through holes.

6 Claims, 4 Drawing Sheets

MOUNTING APPARATUS FOR MEMORY CARD

BACKGROUND

1. Technical Field

The present disclosure relates to mounting apparatuses, and, particularly, to a mounting apparatus for a memory card.

2. Description of Related Art

A memory card is often installed in an electronic device, such as a computer or a server, using a mounting apparatus. The mounting apparatus includes two opposite fixing plates for clamping two opposite ends of the memory card. However, the fixing plates may block airflow to the memory card. In a chassis having a plurality of memory cards arranged in parallel, heat produced by the memory cards can only be dissipated through the narrow spaces between the cards, which is inefficient.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings in which like references indicate similar elements, is illustrated by way of examples and not by way of limitation. It should be noted that references to "an" or "one" embodiment in this disclosure are not necessarily to the same embodiment, and such references mean at least one.

Figure 1:
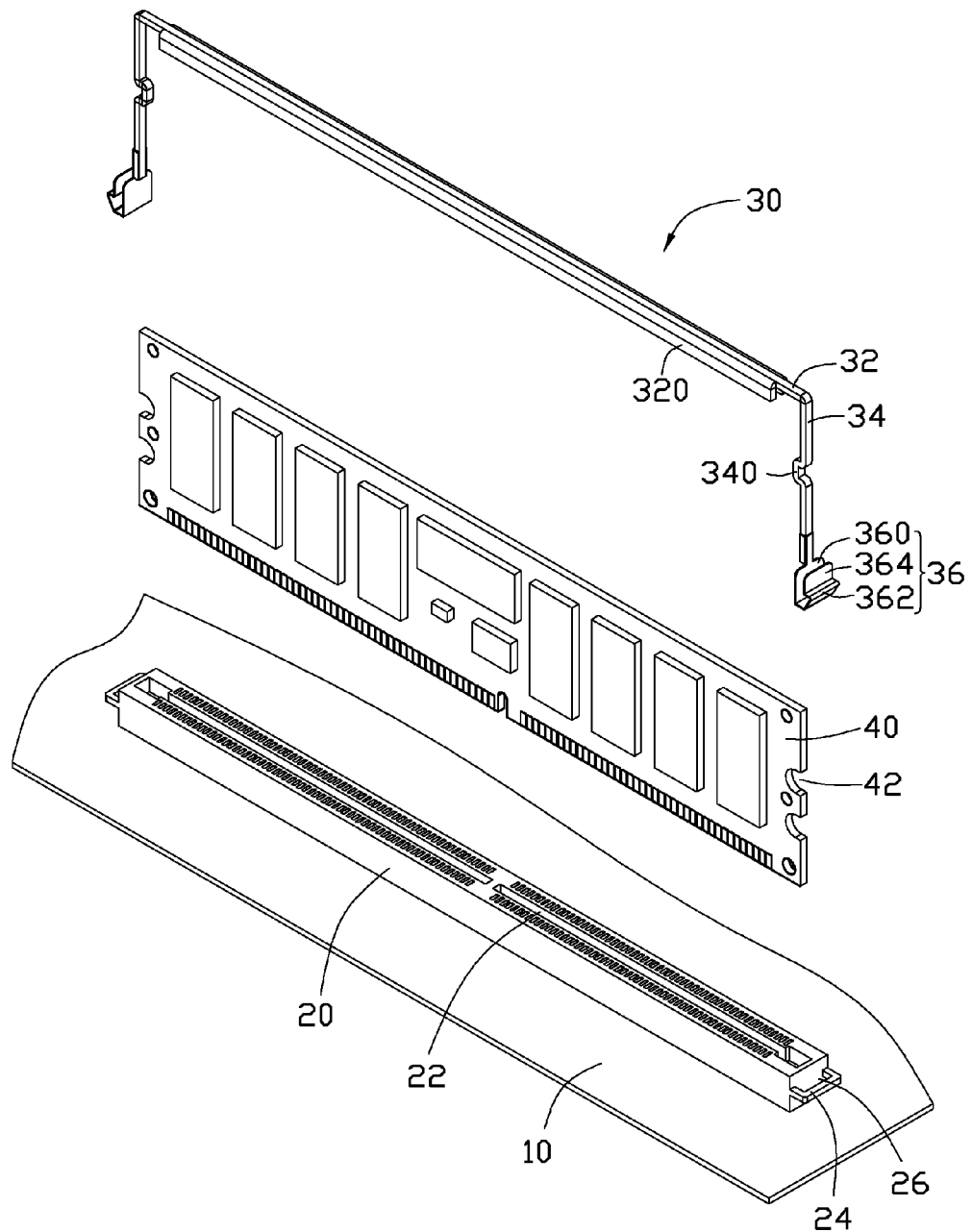
FIG. 1 is an exploded, isometric view of an embodiment of a mounting apparatus for a memory card.

FIG. 1 is one embodiment of a mounting apparatus mounting a memory card 40 to a printed circuit board (PCB) 10. The mounting apparatus includes a connector 20 installed on the PCB 10, and a fixing member 30.

The memory card 40 defines a semicircular cutout 42 in each of opposite ends.

The connector 20 is elongated, and longitudinally defines a slot 22 in a top surface for electrically receiving the memory card 40. An ear 24 extends out from each of opposite end surfaces of the connector 20, and defines a through hole 26 extending through top and bottom of the ear 24.

The fixing member 30 includes a bar 32, two bar-shaped legs 34 perpendicularly extending down from opposite ends of the bar 32, and two latches 36 formed from distal ends of the legs 34 opposite to the bar 32. A clamping piece 320 perpendicularly extend down from each of opposite sides of the bar 32. A center of each leg 34 is recessed inward to form an opposite outward protrusion 340. Each latch 36 includes an L-shaped plate 360 extending down from the corresponding leg 34 and then bent away from the other latch 36, a V-shaped engaging portion 362 extending up from the plate 360, and an operation portion 364 extending up from a distal end of the engaging portion 362 adjacent to the corresponding leg 34.

Figure 2:
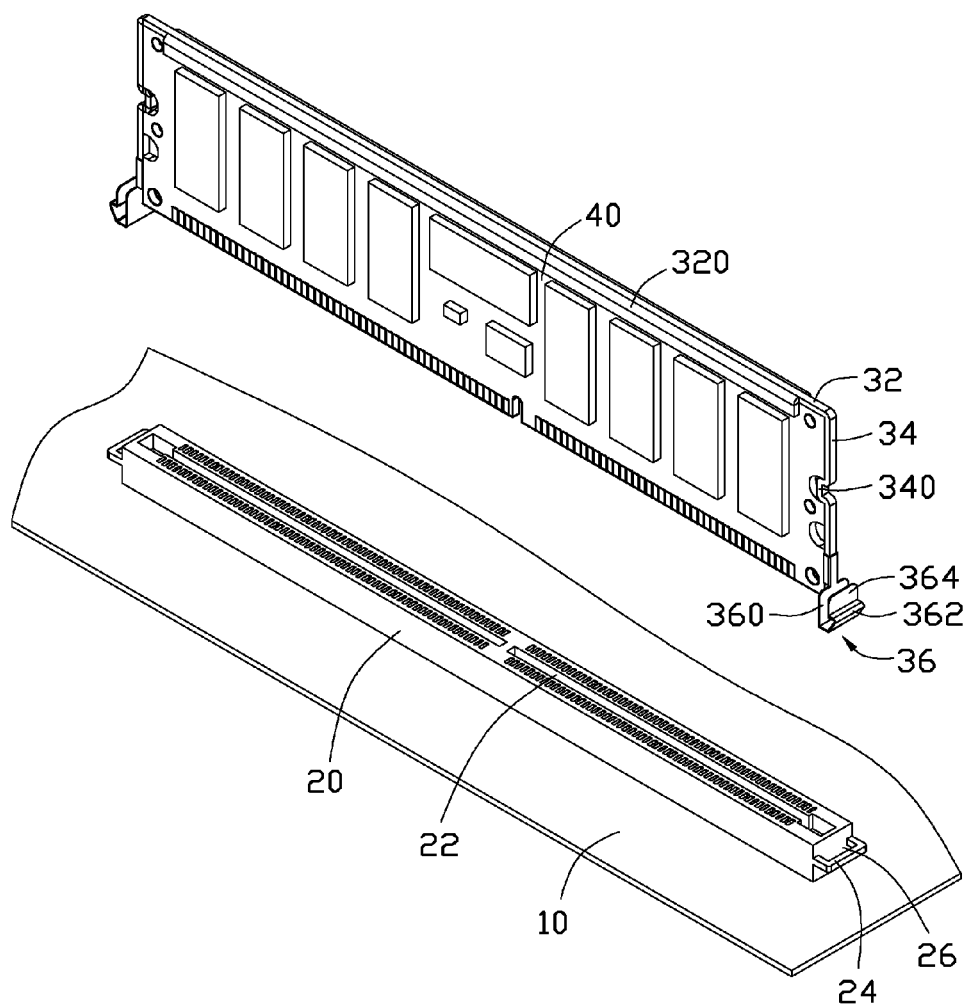
FIG. 2 is a partially assembled view of FIG. 1.
Figure 3:
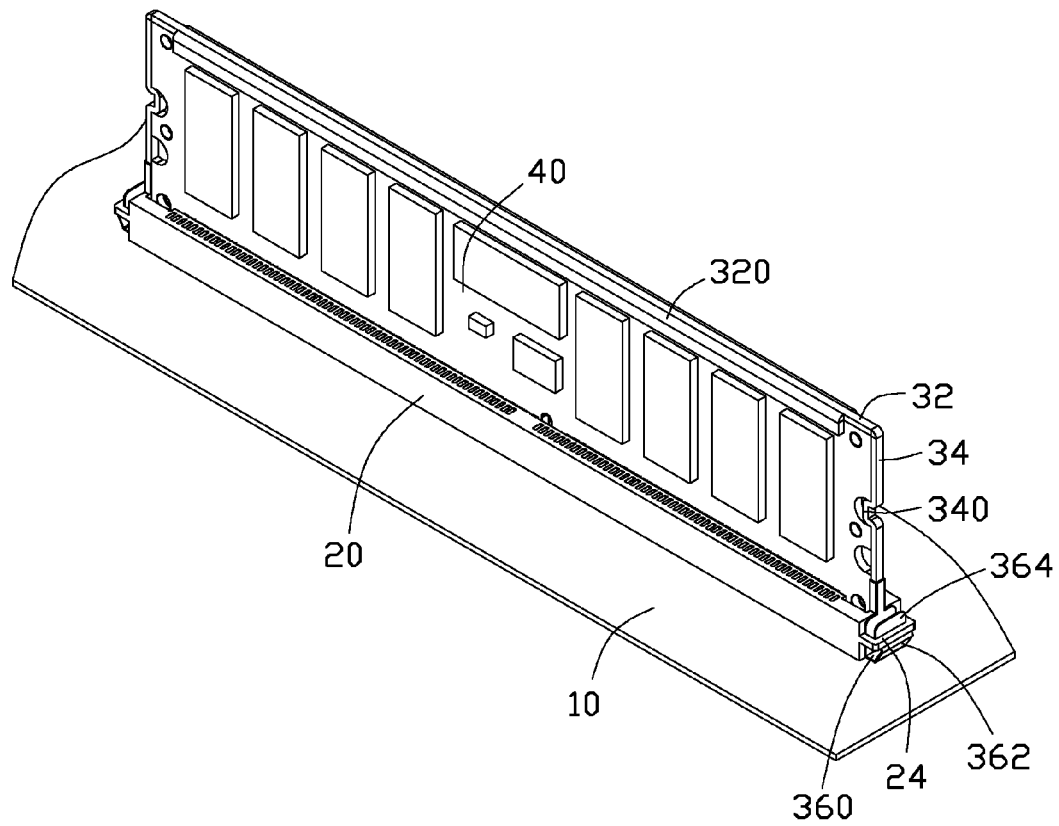
FIG. 3 is an assembled, isometric view of FIG. 2.

FIGS. 2 and 3, show in assembly, the legs 34 are deformed away from each other to be attached to the opposite ends of the memory card 40. After the legs 34 are restored, the protrusions 340 are engaged in the corresponding cutouts 42. The clamping pieces 320 sandwich a top side of the memory card 40. A bottom side of the memory card 40 is then inserted into the receiving slot 22. The latches 36 extend through the corresponding through holes 26, until the engaging portions 362 are engaged with bottom surfaces of the corresponding ears 24.

To detach the memory card 40 from the connector 20, the operation portions 364 are pressed toward each other to disengage the engaging portions 362 from the corresponding ears 24. The memory card 40 and the fixing member 30 are ready to be taken out from the slot 22 and the corresponding through holes 26.

Figure 4:
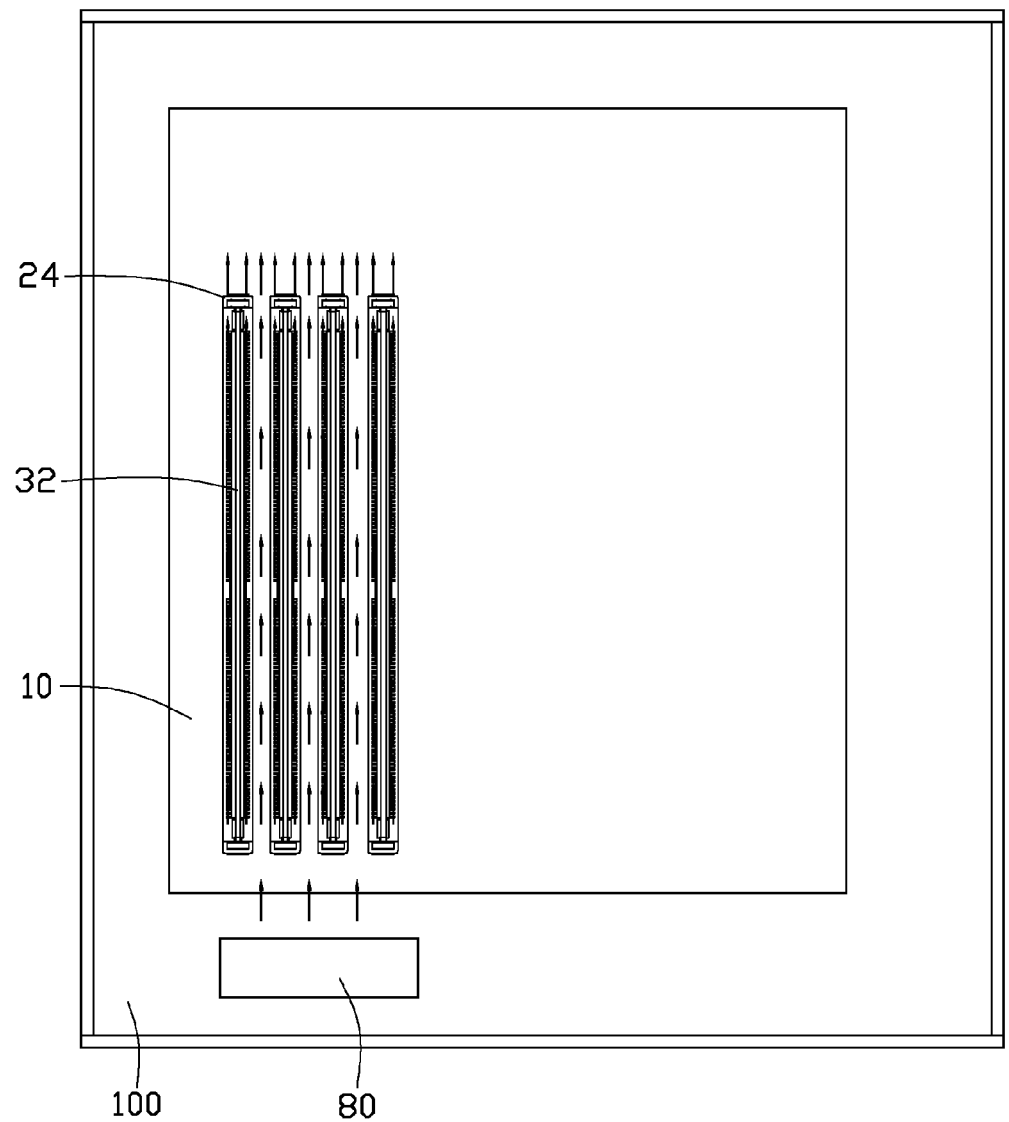
FIG. 4 is a schematic top plan view showing the mounting apparatus for memory cards applied in an electronic system.

Referring to FIG. 4, an electronic system includes an enclosure 100, and a fan 80 installed in the enclosure 100. The PCB 10 is installed in the enclosure 100, with a plurality of memory cards 40 arranged on the PCB 10 in parallel. The fan 80 is arranged beside the PCB 10. Airflow from the fan 80 will flow through passages between the memory cards 40. Because the legs 34 are bar-shaped, and occupy very little of the passages, airflow from the fan 80 can effectively dissipate heat from the memory cards 40.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus for mounting a memory card to a printed circuit board (PCB), the mounting apparatus comprising:
   a connector mounted on the PCB, and defining a slot for receiving a bottom side of the memory card, an ear extending out from each of opposite end surfaces of the connector and defining a through hole; and
   an elongated fixing member comprising a bar attached to a top of the memory card, two legs extending down from opposite ends of the bar to be respectively attached to opposite ends of the memory card, and two deformable latches extending from distal ends of the legs opposite to the bar to be respectively engaged in the through holes,
   wherein each latch comprises an L-shaped plate extending down from the corresponding leg and then bent away from the other latch, a V-shaped engaging portion extending from the L-shaped plate and engaged with the corresponding the through hole of the ear, and an operation portion extending up from a distal end of the engaging portion adjacent to the corresponding leg.

2. The mounting apparatus of claim 1, wherein two clamping pieces extend from opposite sides of the bar to sandwich a top side of the memory card.

3. The mounting apparatus of claim 1, wherein a protrusion protrudes from each leg to be engaged in a cutout of the corresponding end of the memory card.

4. An electronic system comprising:
   an enclosure;
   a fan installed in the enclosure;

a memory card;

a printed circuit board (PCB) installed in the enclosure, and comprising a connector, the connector defining a slot for receiving a bottom side of the memory card, an ear extending out from each of opposite end surfaces of the connector; and an elongated fixing member comprising a bar blocking a top of the memory card, two legs extending down from opposite ends of the bar and abutting against opposite ends of the memory card, and two deformable latches extending from distal ends of the legs opposite to the bar and engaged in the corresponding through holes, wherein each latch comprises an L-shaped plate extending down from the corresponding leg and then bent away from the other latch, a V-shaped engaging portion extending from the L-shaped plate and engaged with the corresponding the through hole of the ear, and an operation portion extending up from a distal end of the engaging portion adjacent to the corresponding leg.

5. The electronic system of claim 4, wherein two clamping pieces extend from opposite sides of the bar to sandwich a top side of the memory card.

6. The electronic system of claim 4, wherein a protrusion protrudes from each leg to be engaged in a cutout of the corresponding end of the memory card.

\* \* \* \* \*